Patented Oct. 5, 1954

2,691,072

UNITED STATES PATENT OFFICE 2,691,072

COMPOSITE MAGNETIC RECORDING TAPE

Robert C. Mathes, Maplewood, N. J., assignor to Bell Telephone Laboratories, Incorporated, New York, N. Y., a corporation of New York No Drawing. Application April 1, 1949, Serial No. 85,045

3 Claims. (Cl. 179—100.2)

This invention relates to sound carriers for magnetic recording.

It is well known that for most effective recording at low frequencies a material of high remanence is most suitable, while a material with high coercive force is more desirable for recording high frequencies. It is also known that the penetration into a magnetic carrier is greater at the lower frequencies.

It is the object of this invention to provide a composite sound carrier for magnetic recording capable of covering a wide range of frequencies.

In accordance with this invention, a composite magnetic recording medium is provided to give superior performance by being able to cover a wide range of frequencies, in that its high remanence will aid in low frequency output while its high coercive force will provide higher frequency response.

The invention comprises a composite magnetic record carrier in which a thin layer of material of high coercive force is deposited, plated or affixed to a material of high remanence. The magnetic materials which find application under this invention are those whose remanences are found in the range of 1,000 to 10,000 gausses and those whose coercive forces are in the range of 100 to 1,000 oersteds. These values of high remanence and high coercive force are to a considerable degree relative. For very high frequencies and very low frequencies, materials having a coercivity in the upper part of the coercive range and materials having a remanence in the upper part of the remanence range may be desirable for certain purposes. However, it is not necessary to select materials within the upper part of the ranges, since a composite tape comprising materials within the indicated ranges would permit greater flexibility in a magnetic record carrier than that obtained in a simple and single layer magnetic sound carrier. The top layer should, however, have a higher ratio of coercive force to remanence than the bottom layer.

For a rolled tape, in accordance with the invention, Cunife 31 which has a coercive force of 550 and a remanence of 5,400 may be used as the base while Cunico 21 which has a coercive force of 710 and a remanence of 3,400 may be used as the thin top layer. A combination tape may be made by plating a thin layer of Cunico 21 onto a highly polished base of Cunife 31 which has been rolled into tape form. The constituents of Cunife 31 are Cu 60, Ni 20 and Fe 20 per cent. A typical Cunico composition is Cu 50, Ni 21 and Co 92 per cent.

Another non-ferrous alloy Silmanal, which has a coercive force of 6,000, may be used for the thin surface layer. Silmanal would be very difficult to erase and would therefore be particularly suited for a record for which a high degree of permanence is desired. Silmanal is an alloy containing Ag 86, Al 5 and Mn 9 per cent.

A discussion of the magnetic properties and the physical constituents of these materials is contained in the January 1946 issue of Product Engineering page 44 in an article by J. H. Goss, entitled "Ductile Permanent Magnets Offer New Design Possibilities." Ductile materials are especially desirable in that they can be rolled into tape form.

The surface material need not necessarily be ductile and it is possible to plate non-ductile magnetic alloys onto other base materials. For example, a cobalt nickel alloy (80 per cent–20 per cent) has been plated on brass tape and discs. This material has a very high remanence of about 10,000 gausses, and a moderate coercive force of 200 oersteds. This type of alloy plated brass tape may be used as the high remanence base upon which, after polishing, an additional thin layer of a high coercive force material may be applied by a plating process.

In still another way of making a composite tape or disc, two materials, one of high remanence and one of high coercive force may be rolled down together from an ingot of two slabs of the two materials welded together.

It is also well known that magnetic sound carriers may be made by applying a layer of finely divided iron oxide particles onto a paper or plastic base. The layer of iron oxide particles may then be coated with a second thin layer of a material having a high coercive force. However, the deposited particles need not necessarily be iron oxide, but may be of any suitable magnetic particles within the remanence range specified.

The composite magnetic record carrier as herein proposed may comprise a layer of magnetic material, within the remanence range specified, in which its thickness may be of the order of 2 or 3 mils. This layer is then surmounted by a layer of material having high coercive force. This thin layer may be about 10 per cent as thick as the layer of material of high remanence, or about 0.1 to 0.3 of a mil thick.

By these processes it is possible to obtain a composite tape in which both the remanence of the base and the coercive force of the top layer are high compared with the values of known simple alloy tapes.

It is to be understood that the above-described arrangements are illustrative of the application of the principles of the invention. Numerous other arrangements may be devised by those skilled in the art without departing from the spirit and scope of the invention.

What is claimed is:

1. The process of recording signals with an electromagnetic transducer which includes the recording of said signals on a self-supporting multiple layer record medium consisting of a layer of a first magnetic material having a given ratio of coercivity to retentivity, surmounted by a layer of a second magnetic material adherently affixed to said first magnetic material, said second magnetic material being disposed nearer to said transducer than said first magnetic material and having a ratio of coercivity to retentivity which is higher than that of said first magnetic material.

2. The process of recording signals with an electromagnetic transducer which includes the recording of said signals on a self-supporting multiple layer record medium consisting of a layer of a first magnetic material surmounted by a layer of a second magnetic material adherently affixed to said first magnetic material and disposed nearer to said transducer than said first magnetic material, said first magnetic material being effective to provide recordings in which low frequency signals are accentuated, said second magnetic material being effective to provide recordings in which high frequency signals are accentuated.

3. The process of recording signals with an electromagnetic transducer which includes the recording of said signals on a self-supporting composite record medium consisting of a layer of a first magnetic material having a thickness in the order of 2 to 3 mils and a remanence in the range of 1,000 to 10,000 gausses surmounted by a layer of a second magnetic material having a thickness of 0.1 to 0.3 mil, a coercive force in the range of 100 to 1,000 oersteds and a higher ratio of coercive force to remanence than said first magnetic material, said second magnetic material being adherently affixed to said first magnetic material and disposed nearer to said transducer than said first magnetic material.

References Cited in the file of this patent

UNITED STATES PATENTS

| Number | Name | Date |
|---|---|---|
| 2,185,300 | Hickman | Jan. 2, 1940 |
| 2,381,463 | Potter | Aug. 7, 1945 |
| 2,443,756 | Williams et al. | June 22, 1948 |

OTHER REFERENCES

"Mechanical Engineering," Aug. 1948. pp. 671–674, Goss, Permanent Magnet Material.

"Metal Progress," November, 1948, p. 704–B.